(12) United States Patent
Tanabe et al.

(10) Patent No.: US 12,459,055 B2
(45) Date of Patent: Nov. 4, 2025

(54) LASER IRRADIATION APPARATUS AND LASER IRRADIATION METHOD

(71) Applicants: Hiroyuki Tanabe, Tokyo (JP); Kazunori Watanabe, Tokyo (JP); Keiichi Serizawa, Kanagawa (JP)

(72) Inventors: Hiroyuki Tanabe, Tokyo (JP); Kazunori Watanabe, Tokyo (JP); Keiichi Serizawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 523 days.

(21) Appl. No.: 17/936,071

(22) Filed: Sep. 28, 2022

(65) Prior Publication Data
US 2023/0173610 A1 Jun. 8, 2023

(30) Foreign Application Priority Data
Dec. 8, 2021 (JP) ................. 2021-198934

(51) Int. Cl.
*B23K 26/08* (2014.01)
*B23K 26/03* (2006.01)
*B41M 5/24* (2006.01)
*G05B 19/402* (2006.01)

(52) U.S. Cl.
CPC .......... *B23K 26/0823* (2013.01); *B23K 26/03* (2013.01); *B41M 5/24* (2013.01); *G05B 19/402* (2013.01); *G05B 2219/37288* (2013.01)

(58) Field of Classification Search
CPC ........ B23K 2101/04; B23K 2103/42; B23K 26/03; B23K 26/032; B23K 26/0344; B23K 26/042; B23K 26/0624; B23K 26/082; B23K 26/0823; B23K 26/0838; B23K 26/355; B23K 26/362; B41J 11/008; B41J 11/0095; B41J 2/4753; B41J 3/40733; B41M 5/24
See application file for complete search history.

(56) References Cited

U.S. PATENT DOCUMENTS

| | | | |
|---|---|---|---|
| 2002/0170889 A1* | 11/2002 | Faitel | B23K 26/0838 219/121.75 |
| 2006/0161380 A1 | 7/2006 | Bottemiller | |
| 2008/0225349 A1* | 9/2008 | Watanabe | B41J 2/473 358/481 |

(Continued)

FOREIGN PATENT DOCUMENTS

| | | |
|---|---|---|
| EP | 2095903 | 4/2012 |
| FR | 3087367 | 4/2020 |

(Continued)

OTHER PUBLICATIONS

Extended European Search Report for 22206911.4 mailed on May 24, 2023.
Japanese Office Action for 2021-198934 mailed on Jul. 8, 2025.

*Primary Examiner* — Tameem D Siddiquee
(74) *Attorney, Agent, or Firm* — IPUSA, PLLC

(57) ABSTRACT

A laser irradiation apparatus includes a laser source configured to emit a laser beam to an object that is being conveyed to allow the object to be irradiated with the laser beam; a rotation detector configured to detect rotation of the object to obtain information on the rotation of the object; and circuitry configured to control laser irradiation onto the object based on the information on the rotation of the object.

11 Claims, 13 Drawing Sheets

(56) References Cited

U.S. PATENT DOCUMENTS

| | | | | |
|---|---|---|---|---|
| 2009/0217707 | A1* | 9/2009 | Lesche | C03B 29/06 65/111 |
| 2012/0285937 | A1* | 11/2012 | Birnbaum | B23K 26/34 219/121.85 |
| 2013/0135425 | A1* | 5/2013 | Yamamoto | B41J 11/008 347/262 |
| 2021/0387906 | A1 | 12/2021 | Ollivier et al. | |
| 2021/0402805 | A1 | 12/2021 | Tamura et al. | |
| 2022/0097414 | A1 | 3/2022 | Hirayama et al. | |
| 2022/0118553 | A1 | 4/2022 | Miyanishi et al. | |

FOREIGN PATENT DOCUMENTS

| | | |
|---|---|---|
| JP | 2004-148379 | 5/2004 |
| JP | 2011-212727 | 10/2011 |
| JP | 2021-037685 | 3/2021 |
| JP | 2021-176648 | 11/2021 |
| JP | 2022-015739 | 1/2022 |
| JP | 2022-035975 | 3/2022 |
| JP | 2022-035976 | 3/2022 |
| JP | 2022-056333 | 4/2022 |
| JP | 2022-057612 | 4/2022 |
| JP | 2022-058127 | 4/2022 |
| JP | 2022-086838 | 6/2022 |

* cited by examiner

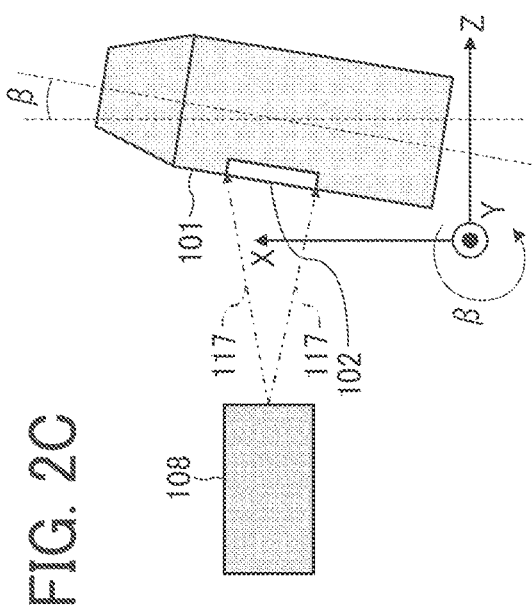
FIG. 2A     FIG. 2B     FIG. 2C
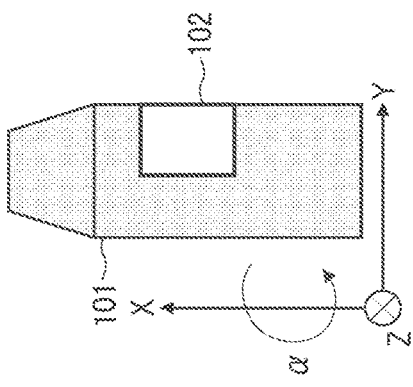
FIG. 2D     FIG. 2E     FIG. 2F
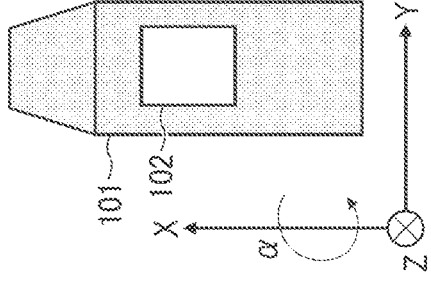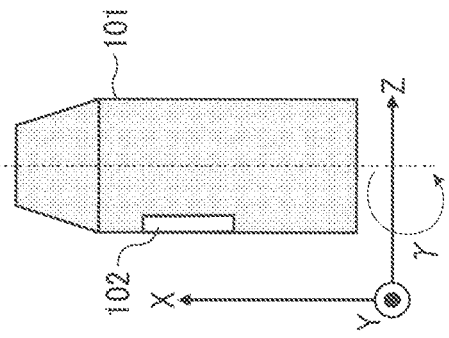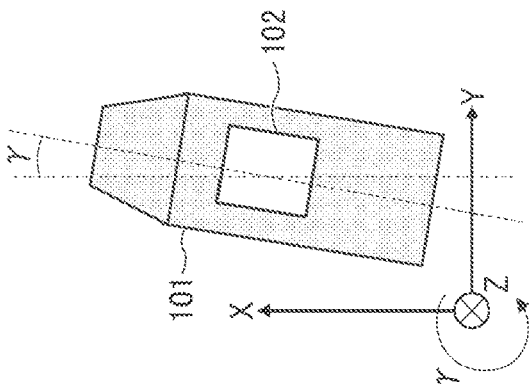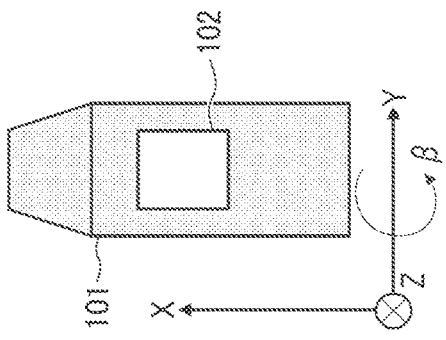

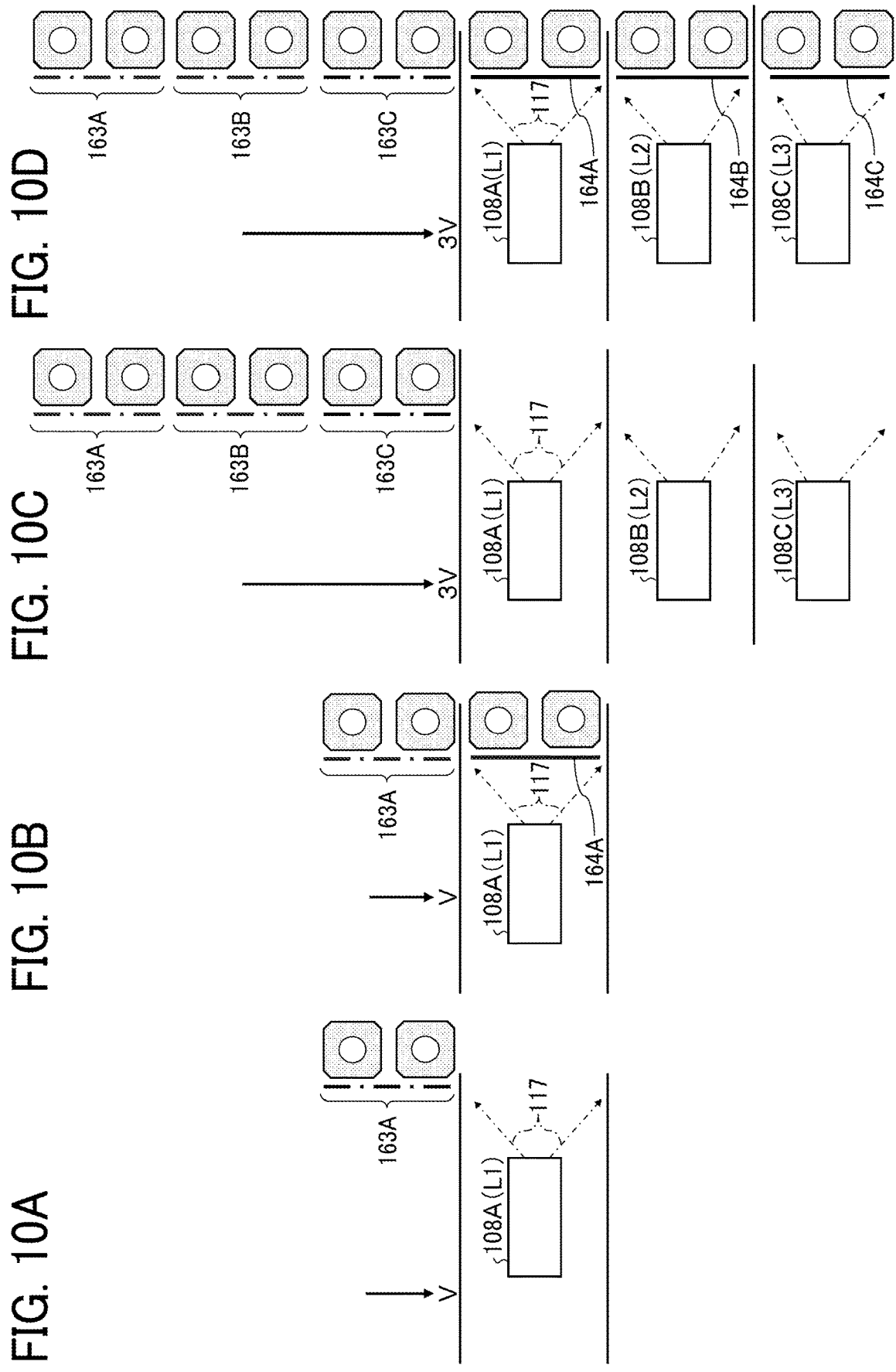

LASER IRRADIATION APPARATUS AND LASER IRRADIATION METHOD

CROSS-REFERENCE TO RELATED APPLICATIONS

This patent application is based on and claims priority pursuant to 35 U.S.C. § 119(a) to Japanese Patent Application No. 2021-198934, filed on Dec. 8, 2021, in the Japan Patent Office, the entire disclosure of which is hereby incorporated by reference herein.

BACKGROUND

Technical Field

The present disclosure relates to a laser irradiation apparatus and a laser irradiation method.

Related Art

A laser marking system and its laser marking method are developed to enable reduction in size, time, and cost.

Further, a method of machining workpieces is also developed to enable a high accuracy machining of workpieces irrespective of different conveyance speeds of the workpieces.

SUMMARY

An embodiment of the present invention provides a laser irradiation apparatus including a laser device configured to emit a laser beam to an object conveyed in a conveyance direction; a rotation detector configured to detect rotation of the object to obtain rotation information of the object; and circuitry configured to control the laser device to irradiate the object with the laser beam based on the rotation information of the object detected by the rotation detector.

Another embodiment of the present invention provides a laser irradiation method including detecting rotation of an object conveyed in a conveyance direction to obtain rotation information of the object; detecting a position of the object; calculating a start position to start irradiating the object with a laser beam based on the rotation amount; calculating the start position based on the position of the object; and determining the start position based on the start position calculated.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 2A, 2B, 2C, 2D, 2E, and 2F are illustrations of the rotation of an object, according to an embodiment of the present disclosure;

FIGS. 10A, 10B, 10C, and 10D are illustrations of a laser irradiation apparatus including multiple devices, according to a modification of an embodiment of the present disclosure;

Figure 1:
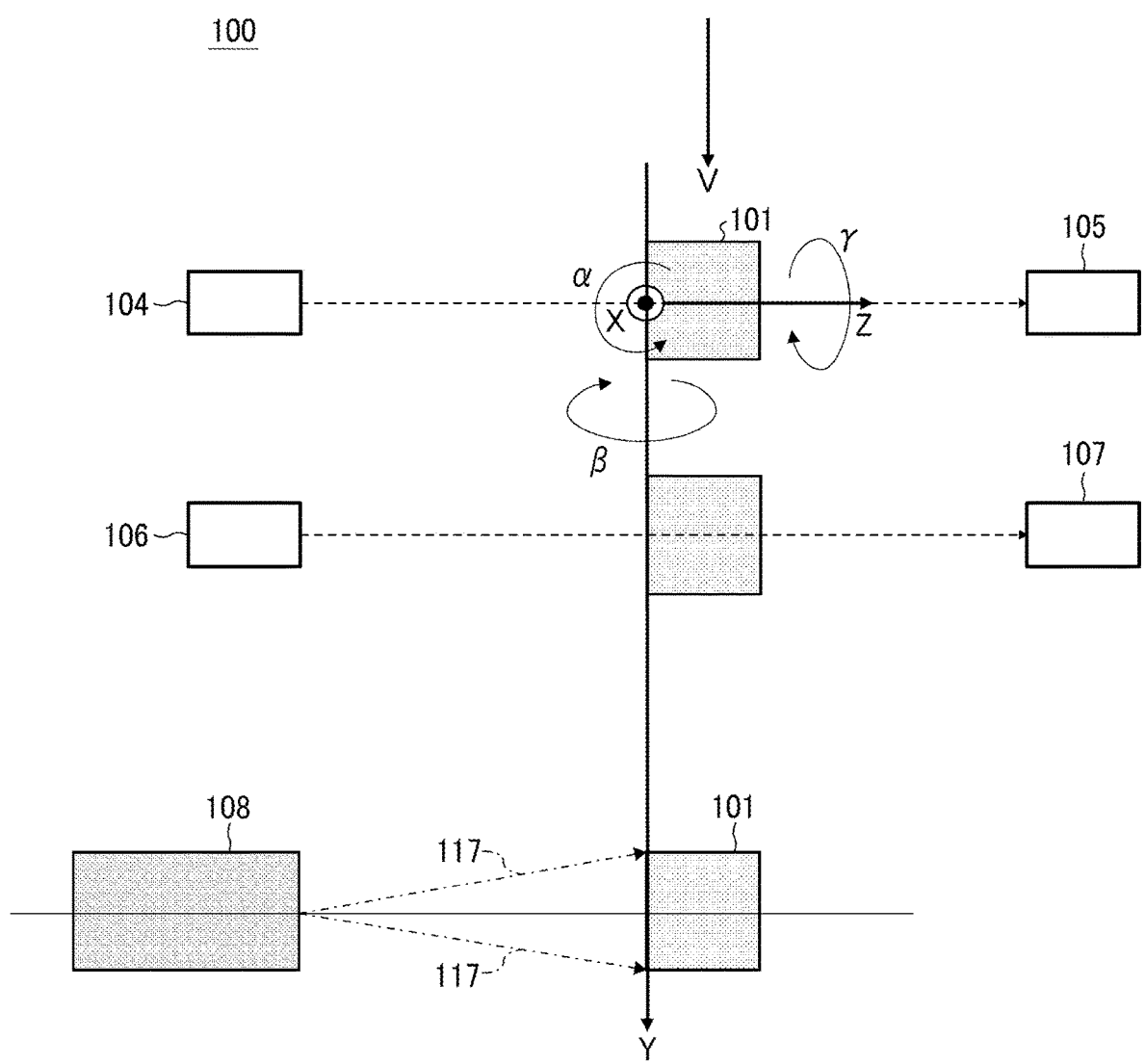
FIG. 1 is an illustration of a laser irradiation apparatus and a configuration of a detector, according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure enable an accurate adjustment of a start position to start laser irradiation onto an object irrespective of whether the object is rotated or not.

Hereinafter, the laser irradiation apparatus according to embodiments of the present disclosure will be described in detail with reference to the drawings.

FIG. 1 is an illustration of a laser irradiation apparatus 100 and a configuration of a detector, according to an embodiment of the present disclosure.

FIG. 1 illustrates the entirety of the laser irradiation apparatus 100. In the laser irradiation apparatus 100, an object 101 is conveyed downstream in a conveyance direction (i.e., the Y-direction) at a conveyance speed V. The object 101 is irradiated with a laser beam 117 emitted from a laser device 108 (a laser device) while being conveyed.

The object 101 may be any object that can be conveyed by the laser irradiation 5 apparatus 100 and can be irradiated with the laser beam 117. When the object is made of resin material, the properties of the resin material may be changed by the laser beam 117.

Position detectors for detecting the position of the object 101 are disposed upstream from the laser device 108 in the conveyance direction. Examples of the position detector include a light emitter 106 and a light receiver 107.

A rotation detector for detecting the rotation of the object 101 is disposed upstream from the laser device 108 in the conveyance direction. Examples of the rotation detector include a light emitter 104 and a light receiver 105.

The rotation of the object 101 is illustrated by rotation angles α, β, γ about respective spatial coordinate axes of spatial coordinates (X, Y, Z).

In the laser irradiation apparatus 100 in FIG. 1, the laser device 108 emits the laser beam 117 to the object 101 that is being conveyed downstream in the conveyance direction.

FIGS. 2A, 2B, 2C, 2D, 2E, and 2F are illustrations of the rotation of an object, according to an embodiment of the present disclosure.

FIGS. 2A to 2F illustrate how the object 101 rotates in space.

In FIGS. 2A to 2F, an α-rotation is a rotation about the X-axis, a β-rotation is a rotation about the Y-axis, and a γ-rotation is a rotation about the Z-axis.

The object 101 has a laser irradiation area 102 to be irradiated with the laser beam 117 emitted from the laser device 108.

FIG. 2A illustrates the object 101 that is to rotate about the X-axis (i.e., in a state before the α-rotation).

FIG. 2B illustrates the object 101 that has rotated about the X-axis (i.e., in a state after the α-rotation).

FIG. 2C illustrates the object 101 that is to rotate about the Y-axis (i.e., in a state before the β-rotation).

FIG. 2D illustrates the object 101 that has rotated about the Y-axis (i.e., in a state after the β-rotation).

FIG. 2E illustrates the object 101 that is to rotate about the Z-axis (i.e., in a state before the γ-rotation).

FIG. 2F illustrates the object 101 that has rotated about the Z-axis (i.e., in a state after the γ-rotation).

The object 101 rotates in the three-dimensional space with the α-rotation, the β-rotation, or the γ-rotation, or with any combination of the α-rotation, the β-rotation, and the γ-rotation.

FIGS. 3A, 3B, 3C, 3D, 3E, and 3F are illustrations of the configuration of the laser irradiation apparatus 100 according to an embodiment of the present disclosure.

Figure 3A:
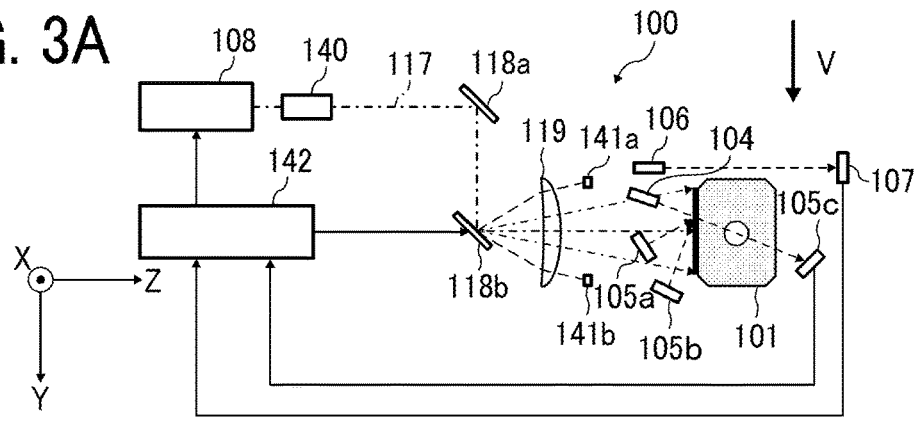
FIGS. 3A, 3B, 3C, 3D, 3E, and 3F are illustrations of a configuration of the laser irradiation apparatus in FIG. 1.
Figure 3B:
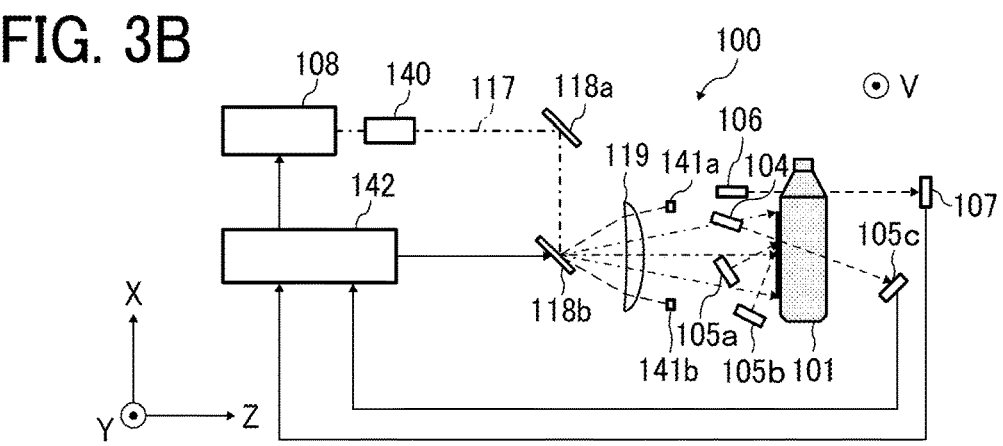

FIGS. 3A and 3B illustrate an optical system and the conveyance direction of the object 101 while the laser device 108 emits a laser beam 117 to the object 101.

FIG. 3A is an illustration of how the object 101 is conveyed in the Y-direction with the conveyance speed V when viewed along the X-axis (or in the X-direction).

The following describes the example in FIG. 3.

The laser irradiation apparatus 100 in FIG. 3A includes a laser device 108, a beam expander 140, a mirror-a 118a (a first mirror) and a mirror-b 118b (a second mirror), a lens 119, and synchronous detectors 141a and 141b. In some examples, the mirror-a 118a and the mirror-b 118b each may be replaced with another element that scans (deflects) the laser beam 117, including a rotary polygon mirror such as a polygon scanner. The mirror-a 118a and the mirror-b 118b constitute a scanner.

As illustrated in FIG. 3A, the object 101 is conveyed in the Y-direction at the conveyance speed V.

The laser irradiation apparatus 100 in FIG. 3A further includes a light emitter 106 and a light receiver 107, each of which serves as the position detector for detecting the position of the object 101 that is being conveyed.

The laser irradiation apparatus 100 still further includes a light emitter 104 and a light receiver 105, each of which serves as the rotation detector for detecting the rotation of the object 101.

The position detector and the rotation detector each may be a transmissive detector or a reflective detector. The position detector and the rotation detector may involve any method.

The timing of laser irradiation is determined by predetermined parameters of: positions at which various sensors are installed; a location of the object 101 that is being conveyed; and a conveyance speed V of the object 101. The predetermined values are values set by the user in advance.

The laser device 108 is a pulsed laser that emits a pulsed laser beam, i.e., a laser beam 117. The laser device 108 emits the laser beam 117 having an output power (i.e., light intensity) suitable for changing the properties of at least one of the surface and the inside (or the inner portion) of the base material of the object 101 irradiated with the laser beam 117. The laser device 108 is capable of on-off control of emission of the laser beam 117, emission frequency control, light intensity control, and other controls. The laser device 108 outputs, for example, a laser beam 117 with a wavelength of 355 nm, a pulse width of 10 picoseconds, and an average power of 30 to 50 W. The laser beam 117 has a diameter of 1 μm or greater and 200 μm or less in a region where the properties of the base material of the object 101 are changed.

The laser irradiation apparatus 100 in FIG. 3A includes only one laser device 108. In some examples, however, the laser irradiation apparatus 100 includes multiple laser devices 108. In such examples using multiple laser devices 108, each laser device 108 is independently controlled for on-off switch, an emission frequency, and light intensity.

In FIG. 3A, the laser beam 117 as parallel light emitted from the laser device 108 has its diameter increased by the beam expander 140 while passing through the beam expander 140 and strikes the mirror-a 118a and the mirror-b 118b. The mirror-a 118a and the mirror-b 118b each work to change the reflection angle under the control of a driver, such as a motor.

With a changing reflection angle of the mirror-a 118a under such control, the laser beam 117 striking the mirror-a 118a is scanned or deflected in the Y-direction. Such a scanning mirror (e.g., the mirror-a 118a) is, for example, a galvano mirror, a polygon mirror, or a micro electro mechanical system (MEMS) mirror.

In FIG. 3A, laser beam 117 is unidimensionally scanned in the Y-direction by the mirror-a 118a and the mirror-b 118b. However, no limitation is intended thereby.

In some examples, the mirror-a 118a and the mirror-b 118b are scanning mirrors each to change the reflection angle between two orthogonal directions so as to scan the laser beam 117 two-dimensionally in XY directions.

At least one of the surface and the inside of the base material of the object 101 is irradiated with the laser beam 117 scanned by the mirror-a 118a and the mirror-b 118b.

The lens 119 serves to allow a constant scanning speed of laser beam 117 that is being scanned by the mirror-a 118a and the mirror-b 118b and converge laser beam 117 onto a certain position on at least one of the surface and the inside of the base material of the object 101. The lens 119 is an f-O lens or an arcsine lens to maintain a constant scanning speed.

The lens 119 and the object 101 are arranged to allow a minimum spot diameter of the laser beam 117 reaching the region where the properties of the base material of the object 101 are changed. The lens 119 may include multiple lenses combined.

The synchronous detectors 141a and 141b output synchronous detecting signals used to synchronize the scanning angle of laser beam 117 with the laser output. The synchronous detectors 141a and 141b each include a photodiode that outputs an electric signal corresponding to the intensity of light received by a corresponding one of the synchronous detectors 141a and 141b. The electric signal as a synchronous detecting signal is output from each photodiode to an irradiation controller 142 of the laser device 108. The irradiation controller 142 works as circuitry.

The irradiation controller 142 outputs a signal for controlling the laser power to the laser device 108, and also outputs a signal for scanning the laser beam 117 to the mirror-b 118b.

FIG. 3B is a side view of the laser irradiation apparatus 100 in FIG. 3A when viewed along the Y-axis. The object 101 is conveyed from the far side to the near side of the screen (i.e., in the Y-direction).

Since FIG. 3B is similar to FIG. 3A, its detailed description thereof will be omitted.

FIGS. 3A to 3F are illustrations of the relative position between the object 101 and the rotation detectors.

Figure 3C:
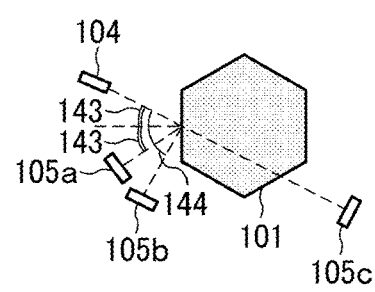

FIG. 3C is an illustration of the relative positions between the rotation detectors (the light emitter 104 and the light receivers 105a, 105b, 105c) and the object 101 having a hexagonal columnar shape as viewed along the X-axis.

In FIG. 3C, the relative position between the light emitter 104 and the light receiver 105 differs depending on the detection method.

In a transmissive detection method using a transmissive rotation detector, the relative position between the light emitter 104 and the light receiver 105C is given.

In a reflective detection method that involves receiving regularly reflected light using a reflective rotation detector, the relative position between the light emitter 104 and a light receiver 105a is given.

In a reflective detection method that involves receiving irregularly reflected light using another reflective rotation detector, the relative position between the light emitter 104 and a light receiver 105b is given.

Using a different rotation detector for each detection method achieves an accurate detection of the rotation of the object 101.

For example, back data is previously recorded for use to accurately recognize the amount of rotation of the object 101. Specifically, the back data relates to changes in the amount of light (or light intensity) received by each of different rotation detectors (e.g., light receivers 105a, 105b, and 105c) due to the rotation of the object 101, which is rotated with different angles while being conveyed.

In some examples, multiple combinations of the rotation detectors (the light emitter 104 and the light receiver 105) may be used. Using multiple rotation detectors enables more accurate detection of the rotation of the object 101 based on the amounts of light transmitted through or reflected from the object 101 at different angles.

In some other examples, a camera is used to detect the rotation of the object instead of using a combination of the light emitter 104 and the light receiver 105 as the rotation detectors.

Since an image captured by a camera has a large amount of information, using such a camera increases the possibility to accurately detect the amount of rotation of the object.

For the object 101 that does not rotate from the reference position, irrespective of which element to use as the rotation detector, the fact that the object does not rotate or has not rotated is recognized by comparing the detected data with back data for the object 101 at the reference position.

Figure 3D:
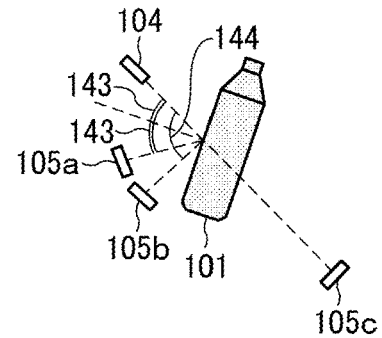

FIG. 3D is an illustration of the relative positions in FIG. 3C when viewed along the Y-axis.

Figure 3E:
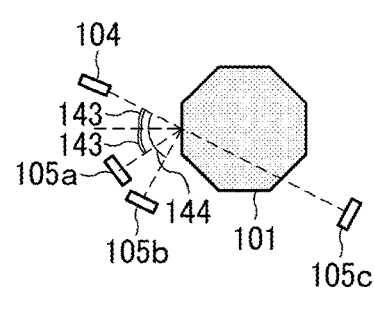

FIG. 3E is an illustration of the relative positions between the rotation detectors (the light emitter 104 and the light receivers 105a, 105b, 105c) and the object 101 having an octagonal columnar shape when viewed along the X-axis, unlike in FIG. 3C in which the object has a hexagonal columnar shape.

Figure 3F:
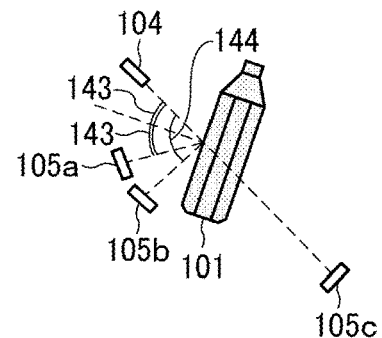

FIG. 3F is an illustration of the relative positions in FIG. 3E when viewed along the Y-axis.

In FIGS. 3C to 3F, the object 101 has a hexagonal columnar shape or an octagonal columnar shape. The same as in FIGS. 3A to 3F applies to other examples in which the object has another polygonal shape or a curved surface shape. Similarly to FIGS. 3C to 3F as described above, using multiple rotation detectors in such other examples enables more accurate detection of the rotation of the object 101 based on the amounts of light transmitted through or reflected from the object 101 at different angles.

With reference to FIGS. 3A to 3F, the rotation detectors are described above for the detectors. The same applies to the position detectors as the detectors. Using multiple position detectors, each used for a different detection method, achieves an accurate detection of the position of the object 101.

FIGS. 4A, 4B, 4C, and 4D are illustrations of the rotation of an object 101 as viewed along the X-axis, according to an embodiment of the present disclosure. In FIGS. 4A, 4B, 4C, and 4D, the object 101 has rotated about the X-axis, i.e., α-rotation.

The following describes an object having a shape with two opposite symmetry planes each parallel to the X-axis for the sake of clarity. For example, the object having two opposite symmetry planes has a square cross section (i.e., YZ plane). In another example, an object having three opposite symmetry planes has a regular hexagonal cross section (i.e., YZ plane). In still another example, an object having sour opposite symmetry planes has a regular octagonal cross section (i.e., YZ plane).

The example in which the object has a square cross section (i.e., YZ plane) will be described.

Figure 4A:
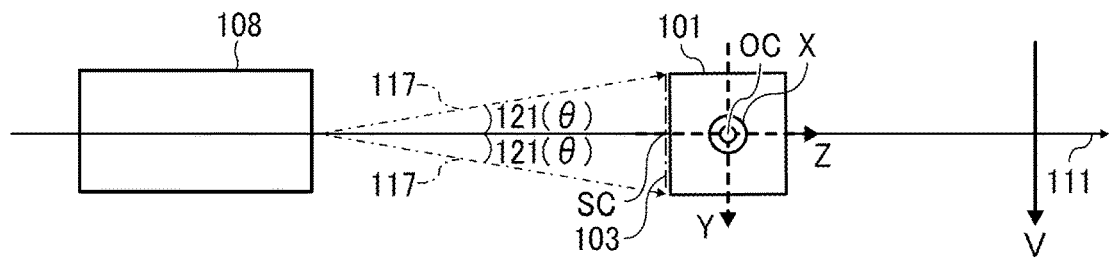
FIGS. 4A, 4B, 4C, and 4D are illustrations of the rotation of an object as viewed along the X-axis, according to an embodiment of the present disclosure.

FIG. 4A is an illustration of an example in which the object 101 is not rotated.

In FIG. 4A, the center SC of a laser irradiation surface 103 of the object 101 coincides with a laser irradiation reference direction 111, which is the centerline of a laser irradiation range as viewed from the laser device 108. This arrangement allows the laser irradiation surface 103 of the object 101 to be irradiated with a laser beam 117 emitted from the laser device 108 without adjustment of an irradiation angle of view (θ) 121 (or simply referred to as an angle of view (θ) 121) of the laser beam 117.

Figure 4B:
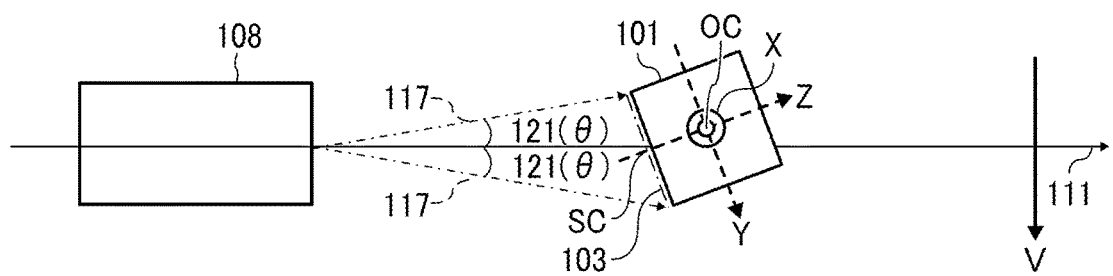

FIG. 4B is an illustration of an example in which the object 101 is rotated about the X-axis (i.e., after α-rotation).

In FIG. 4B, the center of the object 101 is offset from the laser irradiation reference direction 111 (the centerline of the laser irradiation range) at the timing at which the center of the laser irradiation surface 103 of the object 101 coincides with the laser irradiation reference direction 111. The position of the object 101 is typically identified with the position information of the center OC of the object 101. For this reason, the timing illustrated in FIG. 4B indicates a timing before the originally intended timing of laser irradiation.

Figure 4C:
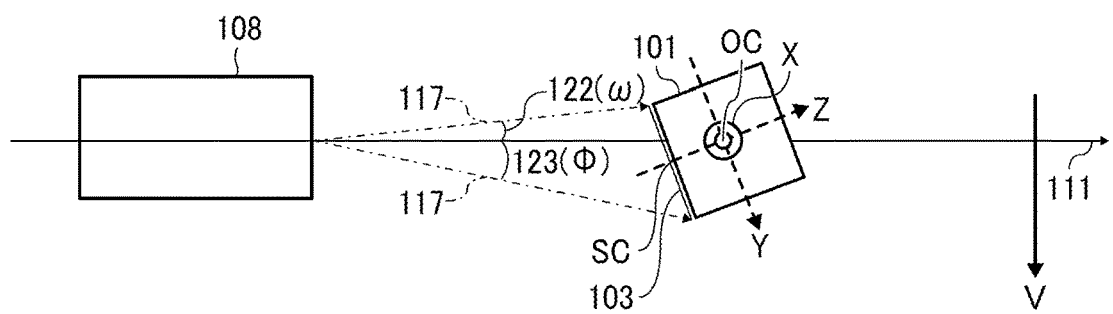

FIG. 4C is an illustration of an example in which the object 101 is rotated with the center OC of the object 101 coincident with the laser irradiation reference direction 111. In other words, FIG. 4C illustrates the timing at which the center OC of the object 101 coincides with laser irradiation reference direction 111.

Although FIG. 4C indicates the originally intended timing of laser irradiation of the object, a laser irradiation angle of view (θ) 121 of laser beam 117 is to be adjusted to a laser irradiation angle of view (ω) 122 and a laser irradiation angle of view (Φ) 123 because of the center SC of the laser irradiation surface 103 of the object 101 offset from the laser irradiation reference direction 111.

Figure 4D:
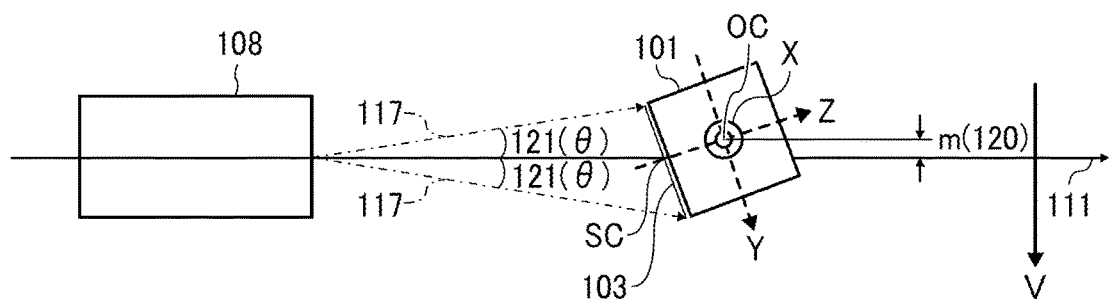

FIG. 4D is an illustration of laser irradiation onto the object 101 at the timing at which the center SC of the laser irradiation surface 103 of the object 101 coincides with the laser irradiation reference direction 111, by starting laser irradiation of the object at an earlier timing.

The earlier timing refers to a timing earlier by the amount of time equivalent to time for conveyance of an offset amount (or a displacement amount) of 120 m between the center of the object 101 and the laser irradiation reference direction 111 due to the rotation of the object 101. The laser device 108 most preferably starts laser irradiation of the object at the timing at which the center OC of the object 101 reaches a position displaced upstream from the laser irradiation reference direction 111 (i.e., the centerline of the laser irradiation range as viewed from the laser device 108) in the conveyance direction by the offset amount (or displacement amount (m)). In other words, the position displaced upstream from the laser irradiation reference direction 111 in the conveyance direction by the displacement amount is most suitable for a laser irradiation start position, meaning that when the center OC of the object 101 reaches the laser irradiation start position, the laser device 108 starts laser irradiation.

The offset amount of 120 (m) obtained by the rotation of the object 101 is given by formula below where L is the width of the laser irradiation surface 103, and Ψ is the rotation angle of the object 101:

$$M=L/2*\sin(\Psi)$$

Figure 5:
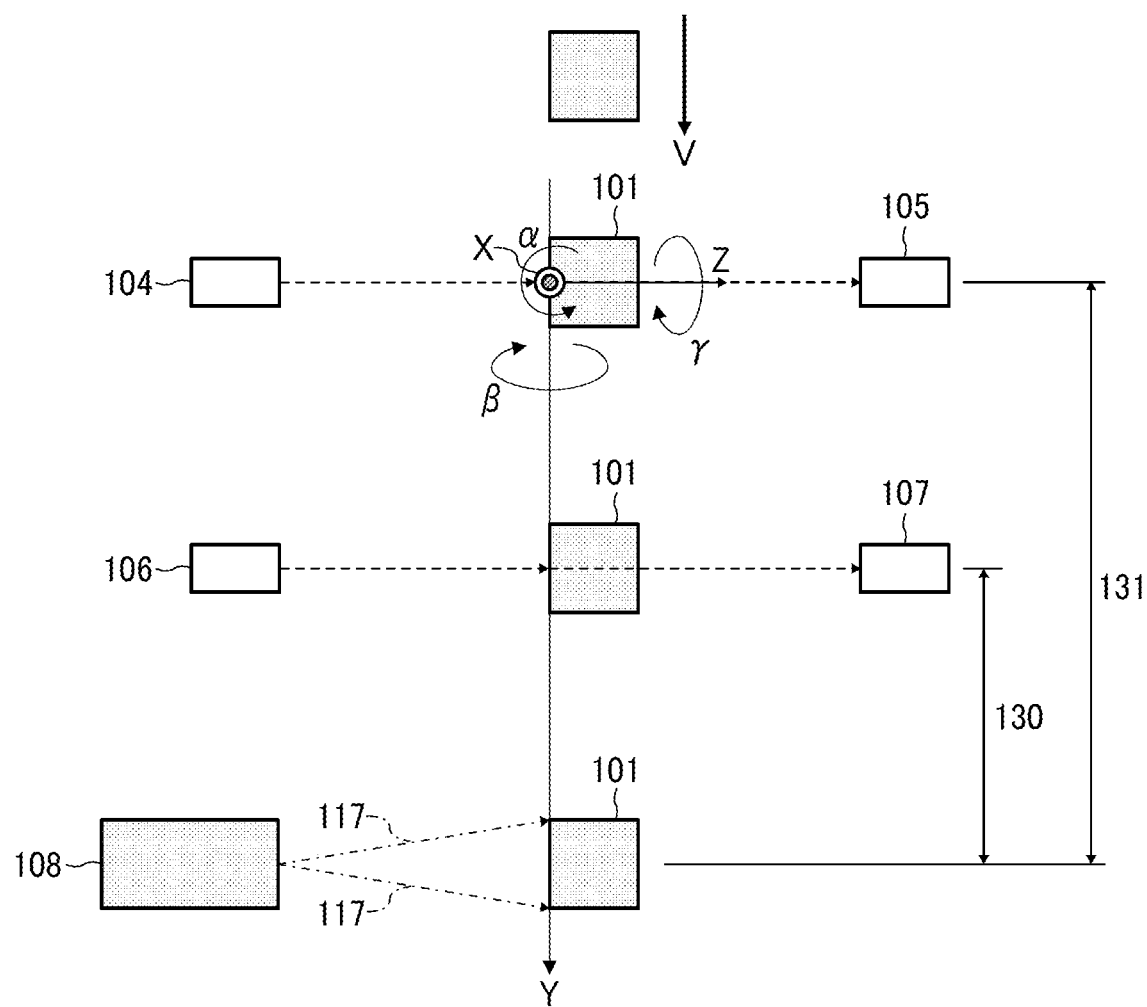
FIG. 5 is an illustration of a rotation detector and a position detector to detect an object, according to an embodiment of the present disclosure.

FIG. 5 is an illustration of the relation between a rotation detector and a position detector for detecting an object according to an embodiment of the present disclosure.

In FIG. 5, the object 101 is conveyed downstream in the conveyance direction (i.e., the Y-direction) at a conveyance speed V.

The object 101 is irradiated with a laser beam 117 emitted from a laser device 108 while being conveyed.

Position detectors for detecting the position of the object 101 are disposed upstream from the laser device 108 in the conveyance direction. Examples of the position detectors include a light emitter 106 and a light receiver 107.

Rotation detectors for detecting the rotation of the object 101 are also disposed upstream from the laser device 108 in the conveyance direction. Examples of the rotation detectors include a light emitter 104 and a light receiver 105.

In FIG. 5, the distance between the laser device 108 and the rotation detectors (the light emitter 104 and the light receiver 105) corresponds to a first interval 131 for adjustment of laser irradiation based on rotation detection, and the distance between the laser device 108 and the position detectors (the light emitter 106 and the light receiver 107) corresponds to a second interval 130 for adjustment of laser irradiation based on position detection.

As illustrated in FIG. 5, the first interval 131 is longer than the second interval 130. The conveyance direction (i.e., the Y-direction) may not be orthogonal to each of the direction in which the position detectors (the light emitter 106 and the light receiver 107) are arranged and the direction in which the rotation detectors (the light emitter 104 and the light receiver 105) are arranged.

The second interval 130 is an interval until the position of the object 101 is substantially detected for the laser device 108.

The first interval 131 is an interval until the rotation of the object 101 is substantially detected for the laser device 108.

As described above, the first interval 131 is longer than the second interval 130 because the processing time of the rotation information (information on the rotation of the object) acquired by the rotation detectors is longer than the processing time of the position information (information on the position of the object) acquired by the position detectors. The arrangement of the rotation detectors upstream from the position detectors in the conveyance direction enables a shorter total processing time. Such a shorter total processing time further enables space saving of the laser irradiation apparatus in the conveyance direction.

Figure 6:
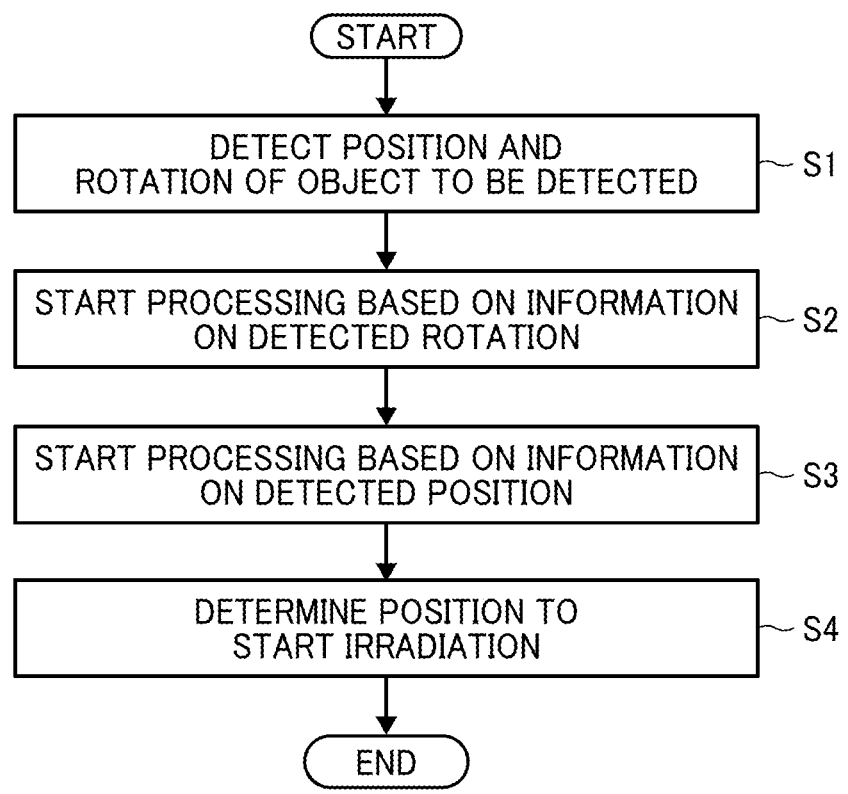
FIG. 6 is a flowchart of a process of detecting an object, according to an embodiment of the present disclosure.

FIG. 6 is a flowchart of a process of detecting an object, according to an embodiment of the present disclosure.

At step S1, the laser irradiation apparatus 100 detects the position and rotation of the object 101 that is being conveyed.

At step S2, the laser irradiation apparatus 100 starts processing rotation information detected in the step S1, for use in laser irradiation.

At step S3, the laser irradiation apparatus 100 starts processing position information detected in step S1, for use in laser irradiation of the object.

At step S4, the laser irradiation apparatus 100 determines a position to start laser irradiation of the object (i.e., a start position to irradiate the object) based on the processing results obtained in step S2 and step S3. In other words, the irradiation controller (142) starts processing based on the information on the rotation of the object (S1) before starting processing based on information on the position of the object (S2), and determines a position to start the laser irradiation of the object based on processed information on the rotation of the object and processed information on the position of the object.

As described above, the processing of the rotation information acquired by the rotation detectors starts before the processing of the position information acquired by the position detectors. This enables a shorter total processing time.

FIGS. 7A, 7B, 7C, 7D, 7E, and 7F are illustrations of the relation between the conveyance direction of an object and a laser irradiation direction, according to an embodiment of the present disclosure.

Figure 7A:
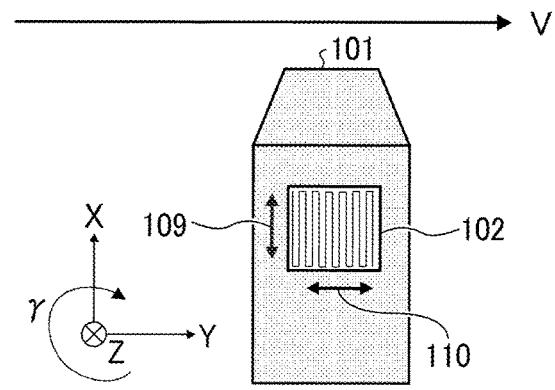
FIGS. 7A, 7B, 7C, 7D, 7E, and 7F are illustrations of the relation between the conveyance direction of an object and a laser irradiation direction, according to an embodiment of the present disclosure.

FIG. 7A is an illustration in which a main scanning direction 109 of laser irradiation with the laser beam 117 that is being scanned over the object 101 is orthogonal to the conveyance direction (i.e., the Y-direction). In FIG. 7A, a sub-scanning direction 110 of the laser beam emitted from the laser device 108 to the object 101 is orthogonal to the main scanning direction 109 and coincides with the conveyance direction (i.e., the Y-direction).

Figure 7B:
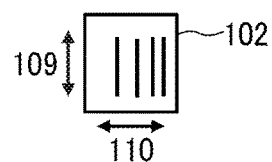

FIG. 7B is an illustration of main scanning laser irradiation on the object 101 that is 5 being conveyed in the Y-direction, with laser beams being scanned at a constant time interval between main scanning sessions.

Figure 7C:
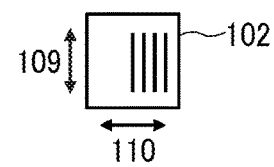

FIG. 7C is an illustration of main scanning laser irradiation on the object at rest (not being conveyed), i.e., free of the effects of the conveyance speed V, with laser beams being scanned at a constant time interval between main scanning sessions.

Figure 7D:
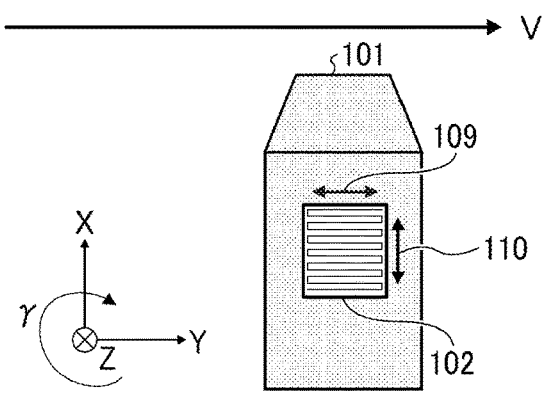

FIG. 7D is an illustration in which the main scanning direction 109 of laser beam 117 that is being scanned over the object 101 is parallel to the conveyance direction (i.e., the Y-direction). In FIG. 7D, the sub-scanning direction 110 is orthogonal to each of the main scanning direction 109 and the conveyance direction (i.e., the Y-direction).

Figure 7E:
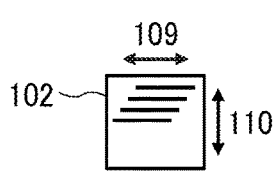

FIG. 7E is an illustration of main scanning laser irradiation on the object 101 that is 5 being conveyed in the Y-direction, with laser beams being scanned at a constant time interval between main scanning sessions.

Figure 7F:
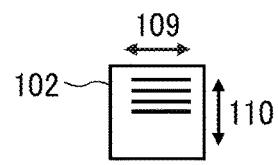

FIG. 7F is an illustration of main scanning laser irradiation on the object at rest (not being conveyed), i.e., free of the effects of the conveyance speed V, with laser beams being scanned at a constant time interval between main scanning sessions.

The scanning speed in the sub-scanning direction is lower than the scanning speed in the main scanning direction. Such difference in scanning speed allows the sub-scanning direction with a lower scanning speed to coincide with the conveyance direction as in FIG. 7A, and thus reduces variations in the scanning on the object 101 (i.e., the start irradiating the object 101) due to detection timing errors.

FIGS. 8A, 8B, 8C, 8D, and 8E are illustrations of a laser beam following in a conveyance direction, according to an embodiment of the present disclosure.

Figure 8A:
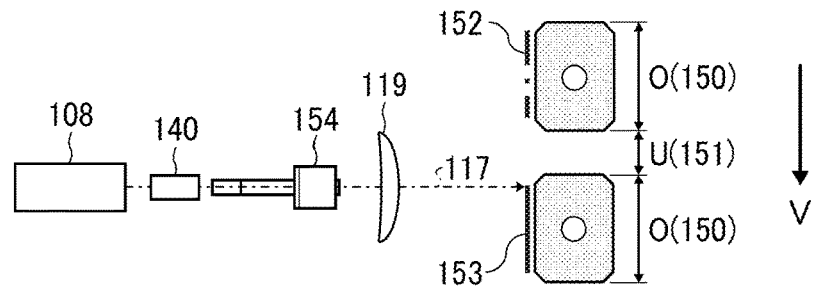
FIGS. 8A, 8B, 8C, 8D, and 8E are illustrations of tracking of a laser beam in a conveyance direction, according to an embodiment of the present disclosure.

FIG. 8A is an illustration of laser irradiation with a laser beam 117 onto an object that is being conveyed.

As described above, the laser beam 117, which forms parallel laser beams, emitted from the laser device 108 undergoes an increase in diameter while passing through the beam expander 140 and reaches the surface of the object that is being conveyed at the conveyance speed V after passing through the lens 119.

In FIG. 8A, multiple objects are being conveyed in the conveyance direction at regular intervals. Further, FIG. 8A indicates a first section O (150) in which an object is present, and a second section U (151) in which an object is absent.

FIG. 8A indicates an irradiation area 153 on the object, the irradiation area 153 that has been irradiated with laser beam 117 (i.e., the irradiation area 153 irradiated with the laser beam 117); and a non-irradiation area 152 that has not been irradiated with laser beam 117 yet (i.e., the non-irradiation area 152 to be irradiated with the laser beam 117).

The laser beam 117 is scanned by a scanner 154. The scanner 154 is, for example, a galvano mirror, a polygon mirror, or a MEMS mirror. In FIG. 8A, the laser beam 117 is unidimensionally scanned in the Y-direction by the scanner 154. However, no limitation is intended thereby. In some examples, scanning mirrors are used to change the reflection angle between two orthogonal directions so as to scan the laser beam 117 two-dimensionally in XY directions.

Figure 8B:
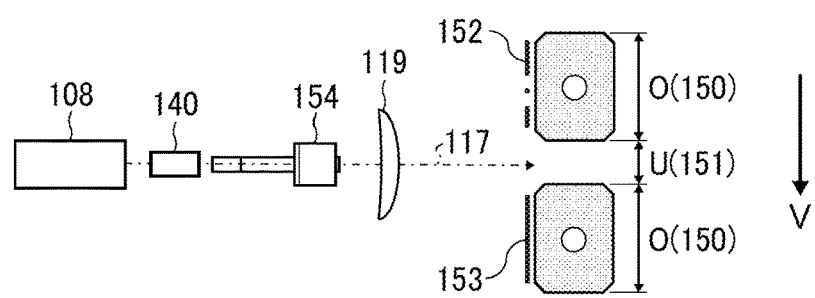

FIG. 8B is an illustration in which the object is further conveyed from the state in FIG. 8A.

In other words, the laser irradiation of the irradiation area 153 is completed (i.e., the irradiation area 153 is completely irradiated with the laser beam from the laser device 108), whereas laser irradiation onto the non-irradiation area 152 has not started yet. In FIG. 8B, the second section U (151), in which an object is absent, is irradiated with the laser beam 117, meaning that the object is not substantially irradiated with the laser beam 117.

Figure 8C:
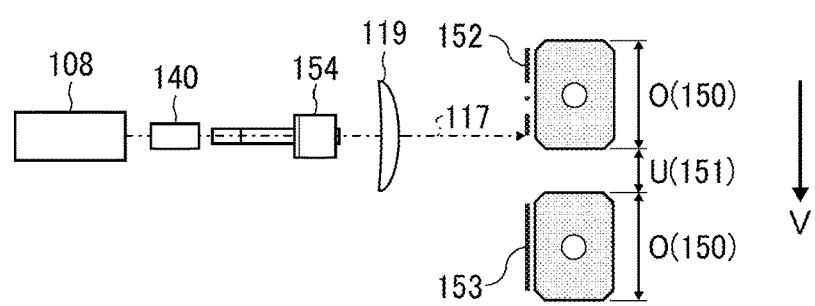

FIG. 8C is an illustration in which the object is further conveyed from the state in FIG. 8B.

In FIG. 8C, laser irradiation onto the non-irradiation area 153 has started (i.e., laser irradiation onto the non-irradiation area 152 has started).

Figure 8D:
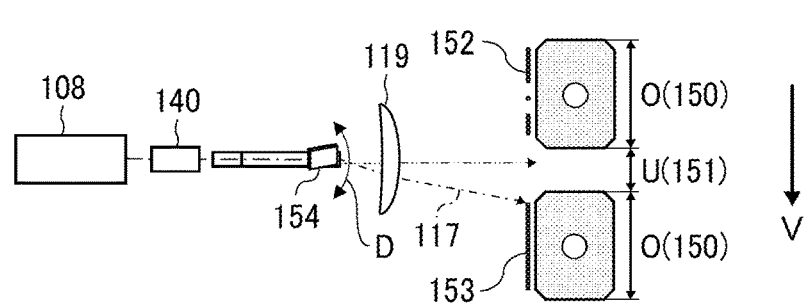
Figure 8E:
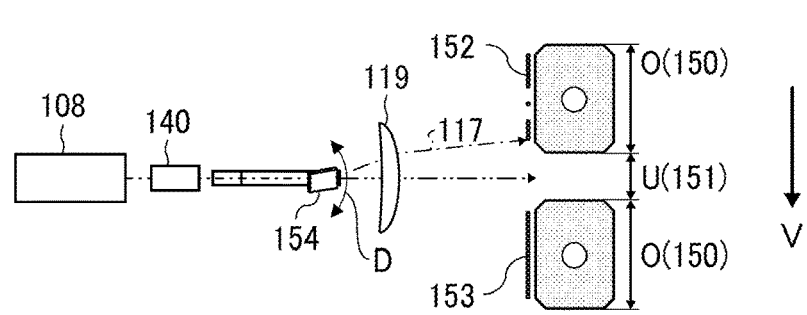

FIGS. 8A to 8C are illustrations in which the laser beam 117 does not follow in the conveyance direction. FIGS. 8D to 8E are illustrations in which the laser beam 117 follows in the conveyance direction.

FIG. 8D is an illustration in which the laser irradiation onto on the irradiation area 153 of the object is completed (i.e., the irradiation area 153 is completely irradiated with the laser beam from the laser device 108), whereas the laser irradiation onto the non-irradiation area 152 has not started yet.

FIG. 8E is an illustration in which laser irradiation onto the non-irradiation area 152 has started (i.e., laser irradiation onto the non-irradiation area 152 has started).

From the state in FIG. 8D to the state in FIG. 8E, a deflector (or the scanner 154) scans the light beam 117 over an angle of view D to allow the light beam 117 to follow in the conveyance direction, thus shortening a period of time during which an object is not irradiated with the laser beam 117.

The laser beam following in the conveyance direction allows a higher irradiation time ratio and a higher productivity.

Figure 9A:
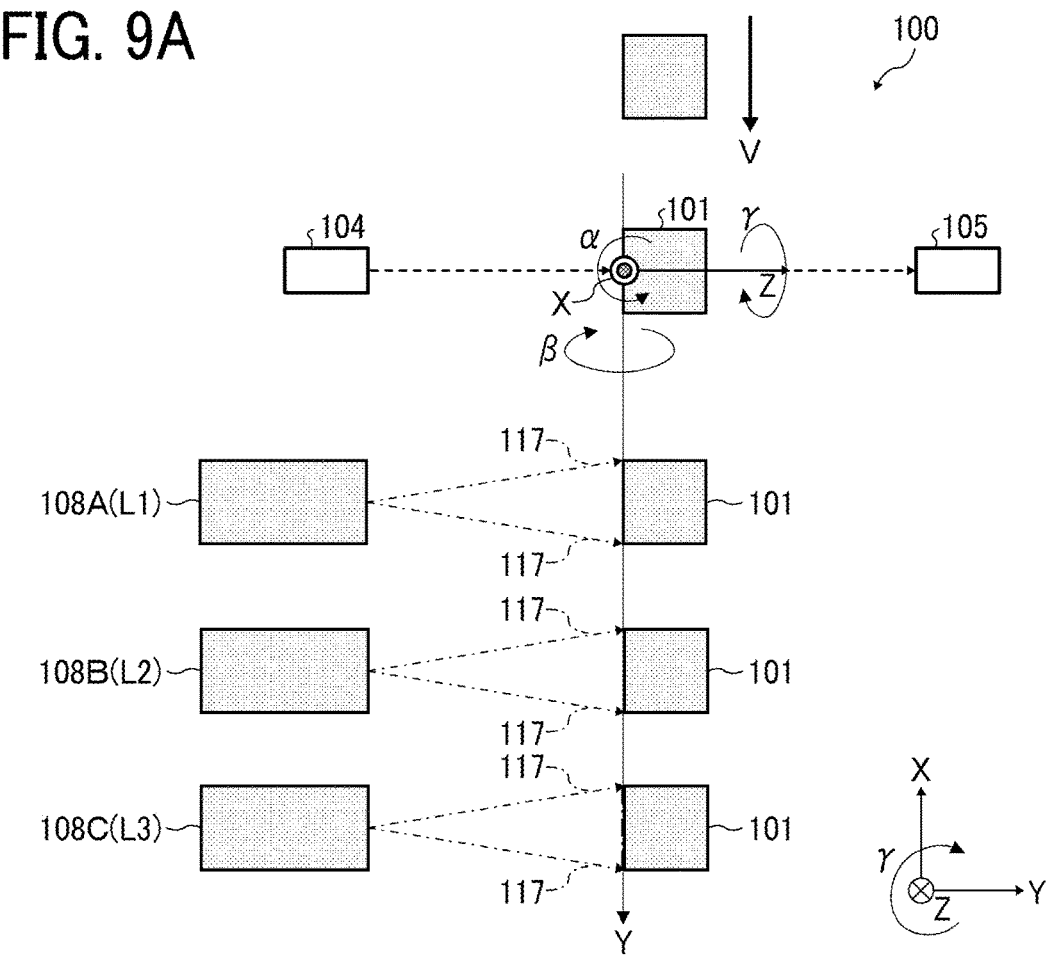
FIGS. 9A and 9B are illustrations of an example in which a laser irradiation apparatus includes multiple laser devices, according to a modification of an embodiment of the present disclosure.
Figure 9B:
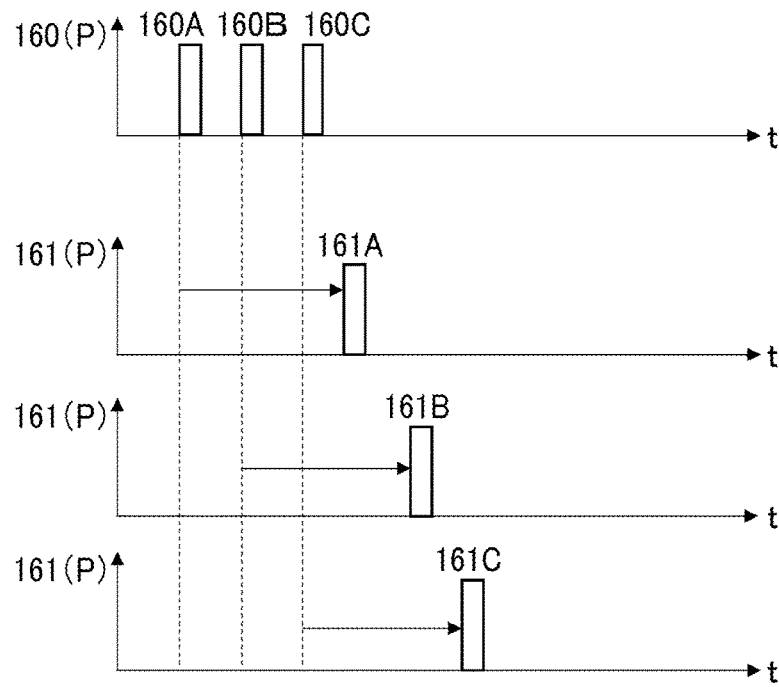

FIGS. 9A and 9B are illustrations of a case in which multiple laser devices are used in a laser irradiation apparatus according to a modification of an embodiment of the present disclosure.

The laser irradiation apparatus 100 in FIGS. 9A and 9B includes a laser device 108A (L1), a laser device 108B (L2), and a laser device 108C (L3).

Such multiple laser devices allow a higher productivity.

However, a single combination of rotation detectors (i.e., one light emitter 104 and one light receiver 105) is used. Using multiple detectors for the respective laser devices 108 may cause higher component costs and more space to be occupied by the detectors.

The laser irradiation apparatus 100 in FIG. 9A uses a single combination of detectors (i.e., one light emitter and one light receiver 105).

FIG. 9B is a timing chart of position detection signals 160A, 160B, 160C and laser irradiation start signals 161A, 161B, and 161C for the laser devices 108A (L1), 108B (L2), and 108C (L3) to start laser irradiation with respect to each object.

Typically, a laser irradiation apparatus using a single combination of detectors may cause variations in time from detection of an object by the single combination of detectors to start of laser irradiation between multiple laser devices 108A (L1), 108B (L2), and 108C (L3).

To avoid such variations in time, the laser device 108A (L1) detects a position detection signal 160A and starts laser irradiation at the timing of a laser irradiation start signal 161A. The laser device 108B (L2) detects position detection signal 160B and starts laser irradiation at the timing of a laser irradiation start signal 161B. The laser device 108C (L3) detects position detection signal 160C and starts laser irradiation at the timing of a laser irradiation start signal 161C.

In other words, the laser irradiation apparatus 100 in FIGS. 9A and 9B includes a single combination of the rotation detectors (the light emitter 104 and the light receiver 105) and multiple laser devices 108A (L1), 108B (L2), and 108C (L3), and is configured such that the time from detection of an object to start of laser irradiation of the object with a laser beam from a corresponding laser device differs between the laser devices 108A (L1), 108B (L2), and 108C (L3).

In the above-described embodiment, a single combination of the rotation detectors (the light emitter 104 and the light receiver 105) is used. However, a single combination of the position detectors (the light emitter 106 and the light receiver 107) may be used instead.

Instead of a pair of detectors, any detector capable of detecting information, including a camera, may be used.

FIGS. 10A, 10B, 10C, and 10D are illustrations of a laser irradiation apparatus including multiple devices, according to another modification of an embodiment of the present disclosure.

FIGS. 10A and 10B are illustrations in which a laser device emits a laser beam to 5 objects being conveyed at a conveyance speed V. FIG. 10A is an illustration of a state before the objects are irradiated with the laser beam (i.e., the objects are not irradiated with the laser beam yet). FIG. 10B is an illustration of a state after the objects are irradiated with the laser beam (i.e., the objects have been irradiated the laser beam).

FIGS. 10C and 10D are illustrations in which laser devices emit laser beams to multiple objects conveyed at a conveyance speed 3V. The objects in FIGS. 10C and 10D are conveyed three times as fast as the objects in FIGS. 10A and 10B.

FIG. 10C is an illustration of a state before the objects are irradiated with the laser beam (i.e., the objects are not irradiated with the laser beams yet). FIG. 10D is an illustration of a state after the objects are irradiated with the laser beams from the laser devices (i.e., the 5 objects have been irradiated the laser beams).

Multiple laser devices 108A, 108B, and 108C used in the laser irradiation apparatus in FIGS. 10C and 10D allows a higher conveyance speed and achieves a higher productivity.

Figure 11:
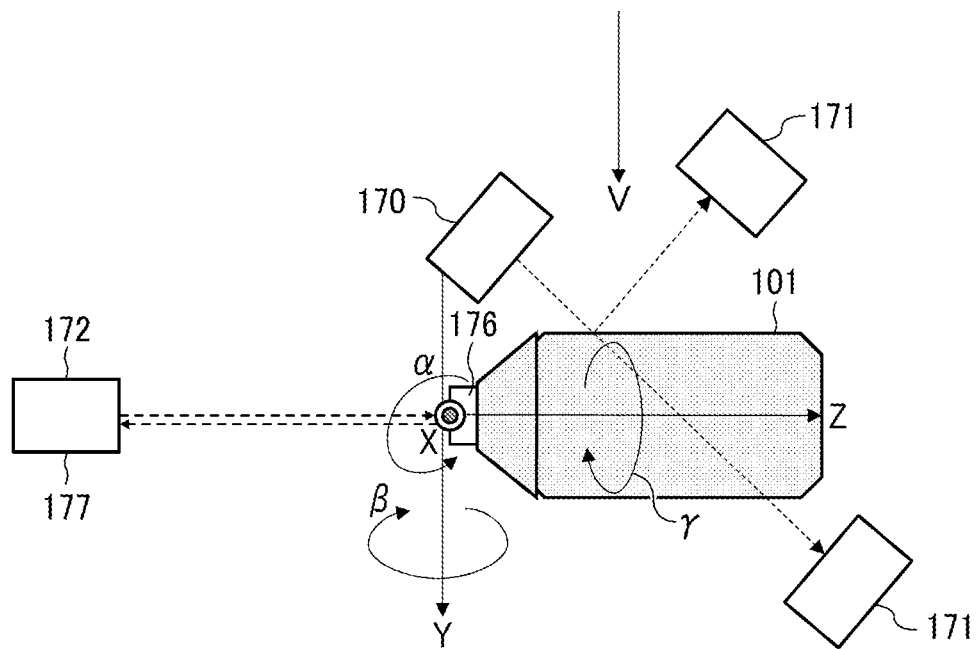
FIG. 11 is an illustration of a laser irradiation apparatus in which an object has a non-transmissive portion, according to a modification of an embodiment of the present disclosure.

FIG. 11 is an illustration of an object with a non-transmissive portion is irradiated with a laser beam in a laser irradiation apparatus according to a modification of an embodiment of the present disclosure.

Irrespective of whether an object 101 is a transmissive object or a non-transmissive object, a pair of detectors (a light emitter 170 and a light receiver 171) is used to detect rotation information and position information of the object 101.

Instead of such a pair of detectors, an integrated detector 172 may be used. Any type of detector may be used.

When the object 101 in FIG. 11 is a non-transmissive object, a distance detector 177 is used to detect a distance to the object 101, the position and rotation of the object 101, achieving a more accurate detection. This is because when the object 101 is a non-transmissive object with a non-transmissive portion, the distance between the object and the detector is measured more accurately.

Combining any of different detectors further allows more accurate detection of the object.

FIGS. 12A, 12B, 12C, and 12D are illustrations of changes in properties of an object, according to embodiments of the present disclosure.

Examples of Changes in Properties of Base Material

The properties of an object changes upon laser irradiation on the object.

Figure 12A:
FIGS. 12A, 12B, 12C, and 12D are illustrations of changes in properties of an object, according to an embodiment of the present disclosure.
Figure 12B:
Figure 12C:
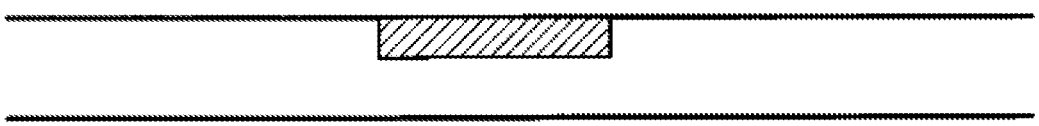

FIG. 12A is an illustration of a change in shape through evaporation. FIG. 12B is an illustration of a change in shape through melting of the base material of the object. FIG. 12C is an illustration of a change in form through crystallization of the base material of the object.

Figure 12D:
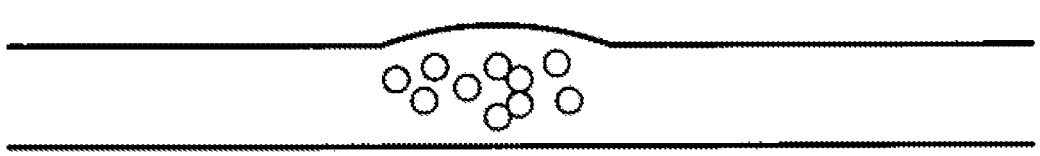

FIG. 12D is an illustration of a change in form through foaming of the base material of the object.

FIG. 12A indicates a concave shape formed through evaporation of base material of the surface of the object.

FIG. 12B indicates a concave shape (i.e., a concave portion) formed through melting of base material of the surface of the object.

In FIG. 12B, the concave portion has raised portion on its peripheral portion (i.e., the concave portion has a raised shape), which differs from FIG. 12A.

FIG. 12C is an illustration of a crystallized surface of the base material of the object. FIG. 12D is an illustration of a foamed inner portion of the base material of the object.

The properties of the surface or inner portion of the object are changed by changing the shape of the surface of the object; crystallizing the surface of the base material of the object; or foaming the inner portion of the base material of the object.

Examples of a method of forming a concave portion by vaporizing the base material of the surface of the object include emitting a pulsed laser having a wavelength ranging from 355 nm to 1,064 nm and a pulse width ranging from 10 fs to 500 fs to the object. Emitting such a laser beam to a portion of the surface of the base material of the object evaporates the portion irradiated with the laser beam, forming a micro-concave portion on the surface of the object.

Alternatively, in response to being irradiated with a continuous-wave (CW) laser beam having a wavelength of 355 nm to 1064 nm, the object has its base material melted to form a concave portion. After melting of the base material, the melted portion of the base material is kept irradiated with the laser beam, causing the inner portion and the surface of the base material to be foamed and fogged.

In order to change the state of crystallization, for example, the base material (e.g., PET) is irradiated with a CW laser having wavelengths of 355 nm to 1,064 nm to rapidly increase the temperature of the base material. Then, the power is reduced to gradually cool the base material. This crystallizes the base material of the PET, forming a fogged portion. Notably, after the increase in the temperature of the base material (e.g., PET), the base material (e.g., PET) is rapidly cooled by, for example, turning off the laser beam. Thus, the PET is changed to amorphous to turn transparent.

Changes in the properties of the base material of the object are not limited to those illustrated in FIGS. 12A, 12B, 12C, and 12D.

The properties of the base material of the object may be changed by yellowing, oxidation, or surface modification.

FIGS. 13A, 13B, 13C, and 13D are illustrations of a detector to detect information on an object, according to a modification of an embodiment of the present disclosure. The following describes the detector again.

Figure 13A:
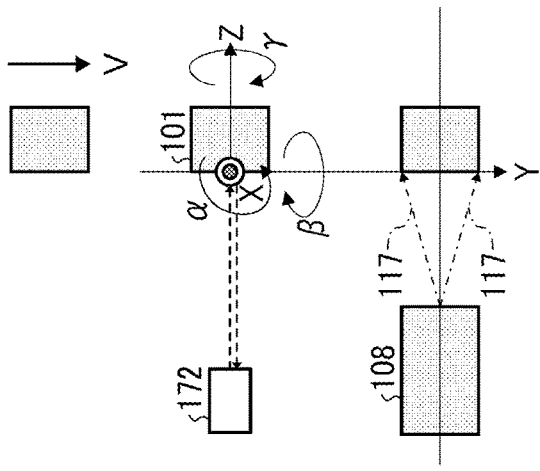
FIGS. 13A, 13B, 13C, and 13D are illustrations of detectors for detecting an object, according to a modification of an embodiment of the present disclosure.

FIG. 13A is an illustration of a transmissive detector including a light emitter 170 and a light receiver 171 used in a laser irradiation apparatus according to an embodiment.

Figure 13B:
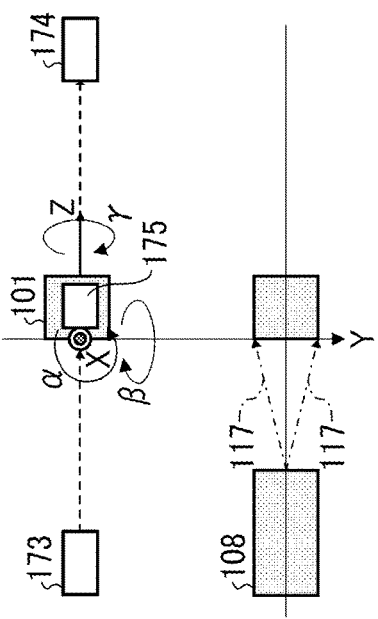

FIG. 13B is an illustration of a reflective detector, which is an integrated detector 172 used in a laser irradiation apparatus according to another embodiment.

Figure 13C:
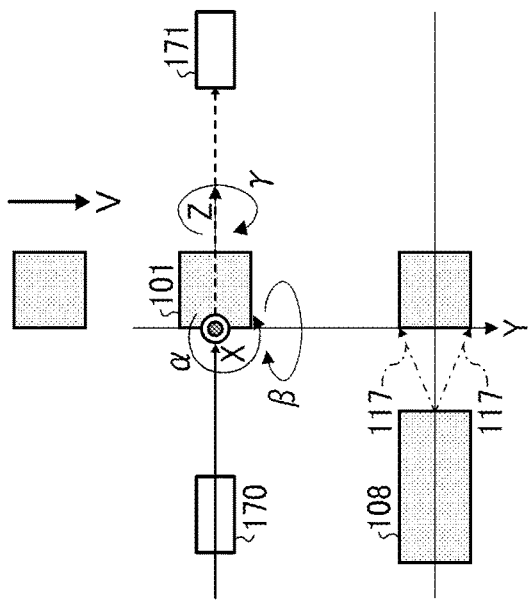

FIG. 13C is an illustration of a reflective detector including a light emitter 170 and a light receiver 171 used in a laser irradiation apparatus according to still another embodiment. In FIG. 13C, the light emitter 170 is separate (independent) from the light receiver 171.

Figure 13D:
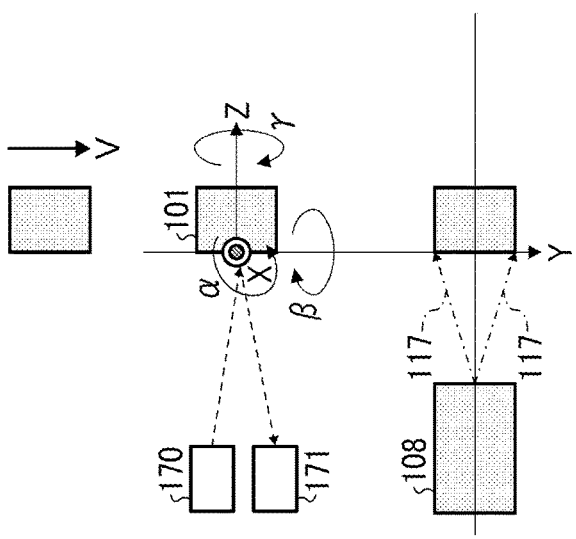

FIG. 13D is an illustration of multiple different detectors used in a laser irradiation apparatus according to yet another embodiment.

In FIG. 13D, a transmissive detector including a light emitter 173 (a detector A) and a light receiver 174 (a detector A), and a reflective detector that is an integrated detector 175 (a detector B) are used.

A different detector for detecting the rotation or the position of an object may be used depending on the transmittance or shape of the object. Alternatively, detectors may be combined depending on the transmittance or shape of the object.

A laser irradiation apparatus 100 according to an embodiment of the present disclosure includes a rotation detector configured to detect rotation of an object 101; and an irradiation controller 142 configured to control irradiation of the object based on rotation information of the object detected by the rotation detector.

This configuration enables a laser beam to be emitted to a desired position of the object that has been rotated.

The laser irradiation apparatus 100 according to an embodiment of the present disclosure determines a laser irradiation onto the object based on information on the amount of rotation of the object detected by the rotation detector. In this case, the irradiation controller 142 determines a laser irradiation onto the object based on the amount of the rotation of the object.

This configuration enables a laser beam to be emitted to a desired position of the object that has been rotated.

The laser irradiation apparatus 100 according to an embodiment of the present disclosure determines a laser irradiation onto the object in the conveyance direction based on information on the amount of rotation in the conveyance direction among the amounts of 5 rotation of the object detected by the rotation detector. In this case, the information on the rotation of the object includes an amount of the rotation of the object in the conveyance direction. Further, the irradiation controller 142 determines a laser irradiation onto the object in the conveyance direction based on the amount of the rotation of the object in the conveyance direction.

This configuration eliminates a process of changing the laser irradiation angle of view and thus prevents an increase in cost of the laser irradiation apparatus and an increase in the size of the apparatus as a whole.

The laser irradiation apparatus 100 according to an embodiment of the present disclosure further includes a position detector that detects the position of the object. This configuration allows detection of the position of the object and thus enables accurate laser irradiation based on the position of the object in addition to the rotation of the object.

In the laser irradiation apparatus 100 according to an embodiment of the present disclosure, the rotation detector is disposed upstream from the position detector in the conveyance direction.

Typically, the processing of the rotation information acquired by the rotation detector takes more time than the processing of the position information acquired by the position detector. In view of such a difference in processing time, the rotation detector is disposed upstream from the position detector in the conveyance direction, thus shortening the total processing time. Such a reduction in processing time achieves space saving of the apparatus in the conveyance direction.

The laser irradiation apparatus 100 according to an embodiment of the present disclosure starts processing based on rotation information of the object detected by the rotation detector before starting processing based on position information of the object detected by the position detector; so as to determine a laser irradiation onto the object. In this case, the irradiation controller 142 starts processing based on the information on the rotation of the object before starting processing based on information on the position of the object, and determines a laser irradiation onto the object based on processed information on the rotation of the object and processed information on the position of the object.

This configuration allows the processing based on the rotation information to start earlier than the processing based on the position information and thus minimizes the total processing time.

In the laser irradiation apparatus 100 according to an embodiment of the present disclosure, the sub-scanning direction of laser irradiation coincides with the conveyance direction of the object.

The scanning speed in the sub-scanning direction is lower than the scanning speed in the main scanning direction. Such difference in scanning speed allows the sub-scanning direction with a lower scanning speed to coincide with the conveyance direction and thus reduces variations in the scanning on the object due to detection timing errors.

In the laser irradiation apparatus 100 according to an embodiment of the present disclosure, the laser beam follows in the conveyance direction of the object.

This configuration allows an increase in the ratio of the irradiation time in the conveyance direction and thus achieves higher productivity.

The laser irradiation apparatus 100 according to an embodiment of the present disclosure includes multiple laser devices configured to emit laser beams to each of multiple objects. The multiple laser devices take different times from the detection of a corresponding object to the start of laser irradiation onto the corresponding object. In other words, the laser device 108 includes multiple laser devices 108A, 108B, and 108C configured to emit laser beams to each of multiple objects being conveyed, with different times from detection of at least one object of the multiple objects by at least one of the rotation detector 104/105 or the position detector 106/107 and to start of laser irradiation onto said at least one object.

Typically, when multiple laser devices are used to increase productivity, multiple detectors are also used. However, such a configuration causes more space to be occupied. For this reason, a single detector is preferably used. In the laser irradiation apparatus including a single detector, time from detection of a corresponding object to start of laser irradiation onto the corresponding object is made different between the multiple laser devices. This enables laser irradiation of the object at a proper timing.

The laser irradiation apparatus 100 according to an embodiment of the present disclosure further includes a non-transmissive detector configured to detect a non-transmissive portion of an object; and a distance detector configured to detect a distance to the non-transmissive portion.

In Aspect 1, a laser irradiation apparatus (an laser irradiation apparatus 100) includes a laser device (a laser device 108) configured to emit a laser beam to an object conveyed in a conveyance direction; a rotation detector (a light emitter 104, a light receiver 105) configured to detect rotation of the object to obtain rotation information of the object; and an irradiation controller (an irradiation controller 142) configured to control the laser device (the laser device 108) to irradiate the object with the laser beam based on the rotation information of the object detected by the rotation detector (the light emitter 104, the light receiver 105).

In Aspect 2, in the laser irradiation apparatus (100) according to Aspect 1, the 5 rotation information includes a rotation amount of the object. The irradiation controller (the irradiation controller 142) determines a start irradiating the object with the laser beam by the laser device based on the rotation amount of the object detected by the rotation detector.

In Aspect 3, in the laser irradiation apparatus (the laser irradiation apparatus 100) according to Aspect 2, the rotation amount includes a rotation amount of the object in the conveyance direction, and the irradiation controller (the irradiation controller 142) determines the start position in the conveyance direction based on the rotation amount in the conveyance direction.

In Aspect 4, the laser irradiation apparatus (the laser irradiation apparatus 100) according to any one of Aspect 1 to Aspect 3, further includes a position detector (a light emitter 106, a light receiver 107) configured to detect a position of the object.

In Aspect 5, in the laser irradiation apparatus (the laser irradiation apparatus 100) according to Aspect 4, the rotation detector (the light emitter 104, the light receiver 105) is disposed upstream from the position detector (the light emitter 106, the light receiver 107) in the conveyance direction.

In Aspect 6, in the laser irradiation apparatus (the laser irradiation apparatus 100) according to Aspect 4 or Aspect 5, the irradiation controller (the irradiation controller 142) calculates the start position based on the rotation information and then calculates the start position based on the position of the object.

In Aspect 7, the laser irradiation apparatus (the laser irradiation apparatus 100) according to any one of Aspect 1 to Aspect 6, further comprising a scanner (a mirror-a 118a, a mirror-b 118b) configured to scan the laser beam emitted from the laser device (the laser device 108) over the object in a sub-scanning direction. The sub-scanning direction coincides with the conveyance direction.

In Aspect 8, the laser irradiation apparatus (the laser irradiation apparatus 100) according to any one of Aspect 1 to Aspect 6, further comprising a scanner (a scanner 154) configured to scan the laser beam over the object in a sub-scanning direction to cause the laser beam to follow in the conveyance direction.

In Aspect 9, in the laser irradiation apparatus (the laser irradiation apparatus 100) according to any one of Aspect 1 to Aspect 8, the laser device (the laser device 108) includes multiple laser devices (laser devices 108A, 108B, 108C) configured to emit laser beams to multiple objects. The multiple laser devices (laser devices 108A, 108B, 108C) emit the laser beams to the multiple objects at different timings.

In Aspect 10, the laser irradiation apparatus (the laser irradiation apparatus 100) according to any one of Aspect 1 to Aspect 9, further includes a non-transmissive detector (a light emitter 170 and a light receiver 171) configured to detect a non-transmissive portion of the object; and a distance detector (a distance detector 177) configured to detect a distance between the distance detector and the non-transmissive portion.

In Aspect 11, a laser irradiation method includes detecting rotation of an object conveyed in a conveyance direction to obtain rotation information of the object (S1); detecting a position of the object (S1); calculating a start irradiating the object with a laser beam based on the rotation amount (S2); calculating the start position based on the position of the object (S3); and determining the start position based on the start position calculated (S4).

In Aspect 12, in the laser irradiation method according to Aspect 11, the calculating the start position based on the rotation amount is performed before the calculating the start position based on the position of the object.

The non-transmissive portion, which allows more accurate distance detection, achieves much more accurate detection of the rotation and position of the object.

Any one of the above-described operations may be performed in various other ways, for example, in an order different from the one described above.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A laser irradiation apparatus comprising:
a laser device configured to emit a laser beam to an object conveyed in a conveyance direction, the object having a polygonal columnar shape including a flat surface;
a rotation detector configured to detect rotation of the object to obtain rotation information of the object; and
circuitry configured to control the laser device to irradiate the object with the laser beam based on the rotation information of the object detected by the rotation detector,
wherein the circuitry is further configured to control a timing at which the laser device starts irradiating the object that rotates around an axis along a direction orthogonal to the conveyance direction based on a rotation amount of the flat surface of the object in the conveyance direction, and
wherein in a case in which the object rotates such that an upstream side of the flat surface of the object in the conveyance direction is closer to the laser device than a downstream side of the flat surface of the object in the conveyance direction, the circuitry is further configured to make the timing at which the laser device starts irradiating the object earlier than a case in which the flat surface is parallel to the conveyance direction.

2. The laser irradiation apparatus according to claim 1, wherein the circuitry determines a start position to start irradiating the object in the conveyance direction based on the rotation amount in the conveyance direction.

3. The laser irradiation apparatus according to claim 1, further comprising a position detector configured to detect a position of the object.

4. The laser irradiation apparatus according to claim 3, wherein the rotation detector is disposed upstream from the position detector in the conveyance direction.

5. The laser irradiation apparatus according to claim 3, wherein the circuitry calculates a start position to start irradiating the object based on the rotation information and then calculates the start position based on the position of the object.

6. The laser irradiation apparatus according to claim 1, further comprising a scanner configured to scan the laser beam emitted from the laser device over the object in a sub-scanning direction, wherein the sub-scanning direction coincides with the conveyance direction.

7. The laser irradiation apparatus according to claim 1, further comprising a scanner configured to scan the laser beam over the object in a sub-scanning direction to cause the laser beam to follow in the conveyance direction.

8. The laser irradiation apparatus according to claim 1, wherein the laser device includes multiple laser devices configured to emit laser beams to multiple objects, and wherein the multiple laser devices emit the laser beams to the multiple objects at different timings.

9. The laser irradiation apparatus according to claim 1, further comprising:

a non-transmissive detector configured to detect a non-transmissive portion of the object; and a distance detector configured to detect a distance between the distance detector and the non-transmissive portion.

10. A laser irradiation method comprising:

emitting a laser beam from a laser device to an object conveyed in a conveyance direction, the object having a polygonal columnar shape including a flat surface;

detecting rotation of the object conveyed in the conveyance direction to obtain rotation information of the object;

detecting a position of the object;

calculating a start position to start irradiating the object with the laser beam based on the rotation information;

calculating the start position based on the position of the object;

determining the start position based on the start position calculated;

controlling the laser device to irradiate the object with the laser beam based on the rotation information of the object;

controlling a timing at which the laser device starts irradiating the object that rotates around an axis along a direction orthogonal to the conveyance direction based on a rotation amount of the flat surface of the object in the conveyance direction; and in a case in which the object rotates such that an upstream side of the flat surface of the object in the conveyance direction is closer to the laser device than a downstream side of the flat surface of the object in the conveyance direction, making the timing at which the laser device starts irradiating the object earlier than a case in which the flat surface is parallel to the conveyance direction.

11. The laser irradiation method according to claim 10, wherein the calculating the start position based on the rotation information is performed before the calculating the start position based on the position of the object.

* * * * *